United States Patent [19]

Rall

[11] Patent Number: 4,856,797
[45] Date of Patent: Aug. 15, 1989

[54] CHUCK FOR GRIPPING A WORKPIECE

[76] Inventor: Gerhard Rall, Sommerhalde 72, D-7142 Marbach, Fed. Rep. of Germany

[21] Appl. No.: 91,922

[22] Filed: Sep. 1, 1987

[30] Foreign Application Priority Data

Sep. 1, 1986 [DE] Fed. Rep. of Germany ....... 3629722

[51] Int. Cl.⁴ ........................... B23B 5/22; B23B 5/34
[52] U.S. Cl. .................................. 279/41 R; 279/54; 279/58
[58] Field of Search ....................... 279/51, 54, 55, 58, 279/41 AR, 46 AR, 1 K

[56] References Cited

U.S. PATENT DOCUMENTS

| | | | |
|---|---|---|---|
| 1,125,780 | 1/1915 | Waite | 279/51 |
| 1,413,161 | 4/1922 | Heald et al. | 279/51 |
| 1,907,553 | 5/1933 | Lundin | 279/55 |
| 2,270,661 | 1/1942 | Montgomery | 279/51 |
| 2,829,900 | 4/1958 | Davis | 279/58 |
| 2,994,539 | 8/1961 | Farnsworth | 279/51 |
| 3,041,078 | 6/1962 | Lawall et al. | 279/51 |

*Primary Examiner*—Eugene R. LaRoche
*Assistant Examiner*—Nathan W. McCutcheon
*Attorney, Agent, or Firm*—Foley & Lardner, Schwartz, Jeffery, Schwaab, Mack, Blumenthal & Evans

[57] ABSTRACT

A chuck comprising a chuck body having guide surfaces, preferably in the form of the surface area of a hollow cone, is provided. Chuck jaws having a correspondingly conical guide surface rest against the surface of the chuck body and are secured to one another by means of rubber-elastic spring elements to form a work head. At the rear end of the work head, the chuck jaws have a circumferential groove which is engaged by an annular coupling part. The coupling part is joined to a coupling sleeve which, in turn, can be coupled to the draw-in device of a machine tool. The coupling part comprises a displacement lock which, in the locking position, limits the distance of displacement of the coupling part at a place at which the contact surfaces on the coupling part and the matching contact surfaces on the chuck jaws still radially overlap one another. In the release position of the displacement lock, the coupling part can be displaced forward in the axial direction so that the contact surfaces on the chuck jaws project from the overlap with the coupling part so that the work head can be removed and exchanged for another work head having a different gripping diameter.

11 Claims, 9 Drawing Sheets

CHUCK FOR GRIPPING A WORKPIECE

BACKGROUND OF THE INVENTION

Several known collet chucks for gripping workpieces at machine tools, particularly at lathes, are provided with three or more chuck jaws which are placed against circular cylindrical chucking bolts. The chucking bolts are each carried longitudinally displaceable to the chuck body in a circular cylindrical guide hole, the longitudinal axis of which is inclined from the free end face of the chuck towards the rear end of the chuck so as to be inclined with respect to the longitudinal axis of the chuck. The chucking bolts are actuated via a common draw-in disk or a common draw-in ring which is coupled to the draw-in device of the machine tool via a chucking tube.

These chucking bolts always have the same contact against the wall of their circular cylindrical guide hole in any axial position, that is, with any chucking diameter of the workpiece. However, since they must necessarily have only a very small dimension in the circumferential direction, the projected contact surface in the guide hole is comparatively small. In addition, the gripping surface for the workpieces has a comparatively small circumferential extent because it can only be constructed by flattening the circular cylindrical chucking bolt.

These collet chucks also have the disadvantage that the chucking bolts are almost completely surrounded by the chuck body. For this reason, the chuck body must have a comparatively large radial dimension. For any given outside diameter, the collet chuck has only a comparatively small centerhole size or, conversely, the chuck has a comparatively large outside diameter for a given centerhole size.

SUMMARY OF THE INVENTION

It is therefore an object of the present invention to provide an improved chuck.

Another object of the invention is to provide a chuck which, for a given outside diameter, has a larger centerhole size than the known collet chucks.

In accomplishing the foregoing objects, there has been provided according to the present invention a chuck having an axis for releasably securing a workpiece to a machine having a means for drawing the chuck toward the machine, the chuck comprising a chuck body having a front and a rear end, the chuck body having a guide surface substantially in the shape of a truncated cone which is coaxial with the axis and which widens in the direction of the rear end of the chuck body; a coupling part slidably carried in the chuck body and displaceable relative to the chuck body along the axis, the coupling part having a generally ring-shaped contact surface adapted to face the front end of the chuck body, the coupling part being adapted to be displaced relative to the chuck body by the means for drawing the chuck toward the machine; and chuck jaw means movably receivable in the chuck body and having a plurality of chuck jaws, each chuck jaw comprising an inner gripping surface radially displaceable relative to the axis for gripping and releasing the workpiece and an outer guide surface, the chuck jaws being secured adjacent one another with spring elements positioned therebetween so that the outer guide surfaces of the chuck jaws form a surface substantially in the shape of a truncated cone which corresponds to the shape of the guide surface of the chuck body, whereby the plurality of chuck jaws can be snugly received within the chuck body, each chuck jaw further comprising a shoulder defining a contact surface adapted to abut the contact surface of the coupling part, whereby the coupling part is axially displaceable to pull the chuck jaws into the chuck body so that the outer guide surfaces of the chuck jaws slidingly contact the guide surface of the chuck body and radially displace the inner gripping surfaces of the chuck jaws to grip the workpiece.

In another aspect of the invention, the chuck comprises a key for changing the chuck jaw means, the key comprising a stem having a plurality of key bits at one end, the key bits being adapted to engage the chuck jaw means and release the chuck jaw means from contact with the coupling part.

Further objects, features and advantages of the present invention will become apparent from the detailed description of preferred embodiments which follows, when considered together with the attached Figures of drawing.

BRIEF DESCRIPTION OF THE DRAWINGS

In the text which follows, the invention is explained in greater detail with the aid of an illustrative embodiment shown in the drawing, in which.

DETAILED DESCRIPTION OF THE PREFERRED EMBODIMENTS

Due to the fact that in one embodiment, the guide surface on the chuck body and the matching guide surfaces on the chuck jaws are truncated cone surface areas, the chuck jaws can be constructed with a comparatively small radial width. Due to the fact that the guide surface on the chuck is a single, continuous truncated surface area, a comparatively thin wall thickness is sufficient in the area of the guide surface even in the case of the chuck body. These two features permit a considerably greater centerhole size of the chuck jaws for a given outside diameter of the chuck body than is possible in the case of the known collet chucks. Due to the fact that the guide surfaces on the chuck body and on the chuck jaws have identical curvatures over the entire circumferential extent of the chuck jaws, a very large support surface which provides almost constant surface loading is obtained for each of the individual chuck jaws. This allows high gripping forces without the risk of localized overloading of the parts which interact with one another.

Due to the fact that the guide surface for the chuck jaws on the chuck body is a circumferential surface, the individual parts of the chuck, particularly the chuck body and the chuck jaws, can be produced simply, inexpensively and with very high accuracy.

Due to the fact that the chuck jaws are combined with one another by means of rubber-elastic spring elements so as to form a work head, the chuck jaws can be manipulated as a single unit and thus can be comparatively quickly and simply inserted and removed.

One embodiment of the chuck ensures that the coupling between the coupling part and the chuck jaws is not inadvertently discontinued even when the travel of the draw-in device of the machine tool is not limited during movement in the direction of the opening position, or at least not at the position in the displacement path at which the contact surfaces at the coupling part and at the chuck jaws are still mutually overlapping. In another embodiment of the chuck, the displacement lock is simply and inexpensively produced and is also very simply operated. A further embodiment of the chuck ensures that, during the operation of the machine tools, the chucking bolts cannot become unscrewed to such an extent that they are flung outward by the centrifugal force so as to cause injuries to persons or damage to items, even if the operator has inadvertently not firmly tightened the locking bolts. In another embodiment, a chuck is provided with a very simple and effective locking device.

In another embodiment of the chuck, the forces of acceleration produced during start-up and braking of the machine tool due to the inertial forces, and also the tangential force due to the cutting forces, need not be absorbed by the guide surfaces and contact surfaces between two adjacent parts, but are instead absorbed by the positive lock between the fixing bolts at the chuck body and by the axial grooves at the chuck jaws.

A further embodiment of the chuck ensures that the workpieces have, in the axial direction, a constant alignment which is independent of the chucking diameter of the workpieces. At the end of the chucking movement of the chuck jaws, the workpiece is always firmly pulled against the stop element by the axial component of the movement. In another embodiment of the chuck, an axial alignment of the workpieces in relation to the chuck jaws is achieved.

In yet a further embodiment, the chuck is constructed so that, when the workhhead is exchanged, a new work head can be coupled to the coupling part by means of a key in such a manner that the work head is connected via the coupling part to the draw-in device of the machine tool and thus can be drawn into the chuck along the conical guide surfaces to such an extent that the contact surfaces between the coupling part and the chuck jaws sufficiently overlap one another. This is of particular advantage for work heads which, due to their dimensions or due to the magnitude of the expanding force of the rubber-elastic spring elements between the chuck jaws, cannot be easily pressed by hand into the chuck body up to the coupling position. In another embodiment, an improved engagement of the key at the coupling part is provided.

In a further embodiment, the chuck is adapted to jointly receive a work head which is already combined with the key outside the chuck. A further embodiment facilitates combining the key with the work head by providing a contact disk, thereby permitting the key to be pushed into the work head up to but not beyond the correct axial position and permitting the work head to be placed onto the key up to the correct position while preventing it from being inadvertently pushed past this point.

Figure 1:
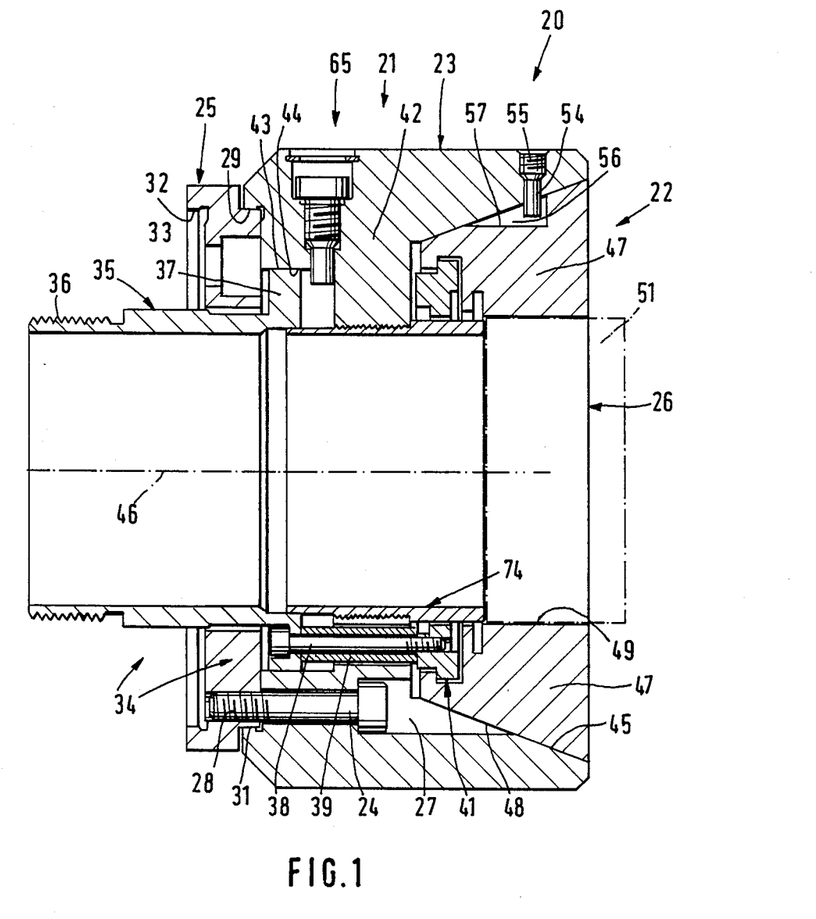
FIG. 1 is a longitudinal section of the chuck with a work head in chucking position.

Referring generally to FIG. 1, the chuck 20 comprises a chuck body 21 and a work head 22. The chuck body 21 has a circular cylindrical parent body 23 which is connected to an assembly ring 25 by means of a number of head screws 24. The head screws 24 are inserted from the front free end face 26 of the chuck 20 into a throughhole having shoulders and are screwed into threaded holes in the assembly ring 25 aligned with the throughholes. This makes it possible to assemble and disassemble the parent body 23 from the end face 26.

The parent body 23 and the assembly ring 25 are accurately coaxially centered with respect to one another via a cylindrical centering surface 29 located on the inside and a centering surface 31 located on the outside. The assembly ring 25 has a cylindrical centering surface 32 on the inside which centers the assembly ring 25 on a centering surface located on the outside of the machine tool (not shown). The assembly ring 25 is mounted by means of head screws which are inserted from the end face 26 into throughholes with shoulders 33. The assembly ring 25 can be installed and removed from its end face.

In the interior of the chuck body 23, an actuating device 34 is accommodated. This includes a draw-in sleeve 35 which is provided at its rear end (facing away from the end face 26) with an outside thread 36 by means of which it can be connected to the draw-in tube of the machine tool. At its front end, the draw-in sleeve 35 has a circular ring-shaped flange 37. In the flange 37 are a number of throughholes with shoulders into which head screws 38 are inserted from the rear end. These screws each extend through the hollow space of a respective spacing sleeve 39 and are screwed into respective threaded holes of a circular ring-shaped coupling part 41. The spacing sleeves 39 extend through throughholes of a disk-shaped part 42 of the chuck body 23. In this manner, the coupling part 41 which is located in the vicinity of the end face 26 is connected to the draw-in sleeve 35 and is positioned to be connected to the draw-in device of the machine tools.

The flange 37 has, on its outer rim, a circular cylindrical guide surface 43 which interacts with a guide surface 44 located on the inside of the chuck body 21. Guide surface 43 is an axial guide for the actuation device 34.

The work head 22 is disposed in the area of the front end of the chuck body 21. To receive work head 22, the chuck body 21 (specifically, the parent body 23) has a circumferential guide surface 45 in the form of a truncated cone, the angle of which is generally 30°. The surface lines of this guide surface 45 are thus inclined 15° from the longitudinal axis 46 of the chuck 20. In the illustrative embodiment shown, the work head has six chuck jaws 47. These jaws have, at their outside, a guide surface 48 which partially circumferentially extends over all chuck jaws 47 and which matches the guide surface 45. Each guide surface 48 is therefore constructed as segments of a truncated cone surface area. On their inside, the chuck jaws 47 have a gripping surface 49 which is generally constructed as a segment of a circular cylinder surface. Depending on the dimensions of the workpieces, such as those of workpieces 51 which are indicated by a dot-dash line in FIG. 1, these gripping surfaces 49 can have a shape which deviates from the circular cylinder surface, both in the circumferential direction and in the axial direction and, for example, which is contoured along the surface.

Figure 2:
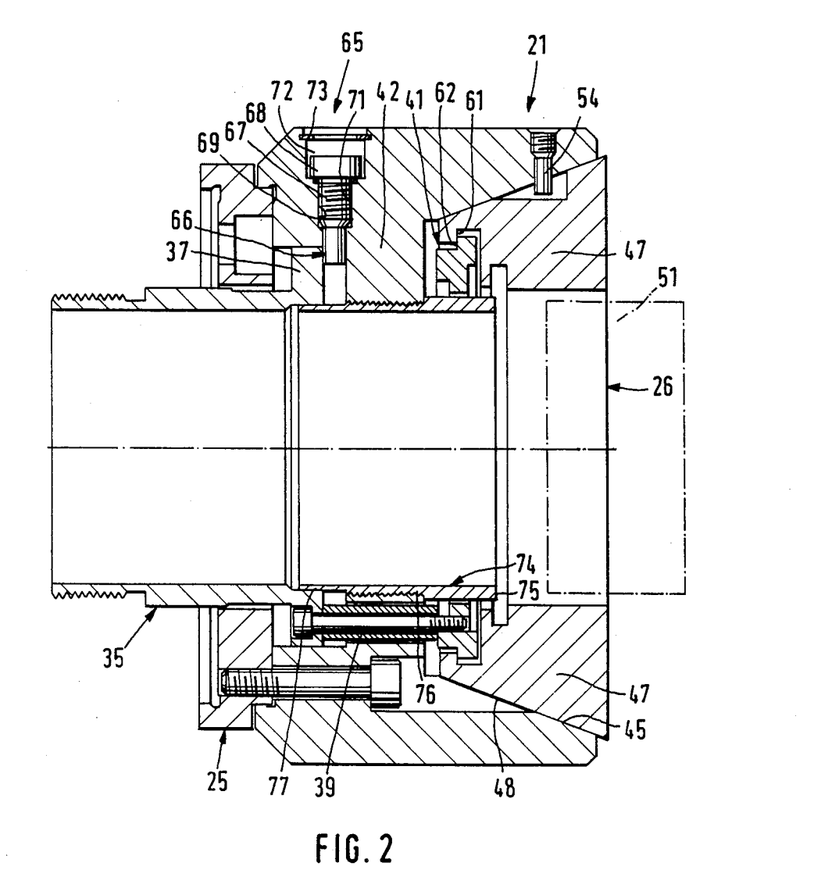
FIG. 2 is a longitudinal section of the chuck in releasing position.
Figure 3:
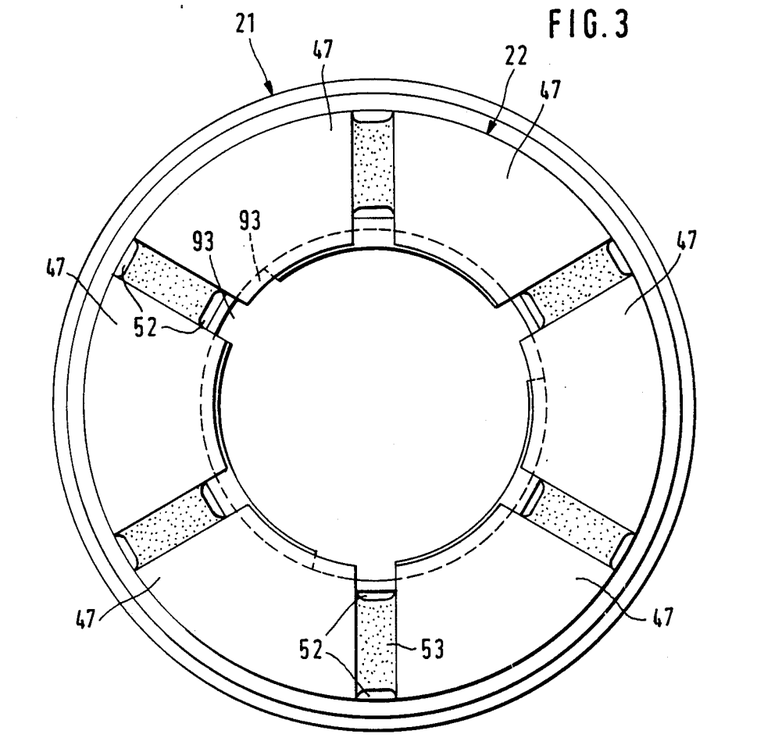
FIG. 3 is a front view of the chuck.

As shown in FIG. 3, gaps 52 of a particular width exist between the chuck jaws 47. In these gaps 52, rubber-elastic spring elements 53 are firmly joined to each pair of adjacent chuck jaws 47, preferably by being molded or vulcanized to them. The spring elements 53 are a highly elastic material. They are constructed in such a manner that they exert a certain expanding force on the chuck jaws 47 in the mid-position of gripping of the chuck jaws 47. The mid-position of gripping means the relative position of the chuck jaws with respect to one another in which their guide surfaces 48 located on the outside rest fully against the truncated cone-shaped generating curve of the envelope to which the guide surface 45 of the chuck body 21 is also matched and whose gripping surface 49 has a radius which is exactly the nominal value. Depending on the deviations of the outside diameter of the workpieces 51 from their nominal value, the actual gripping position of the chuck jaws is either more on the outside or more on the inside, both in the radial direction and in the axial direction, with respect to the chuck body 21. In addition, the rubber-elastic spring elements 53 are constructed in such a manner that they still exert a certain expanding force on the chuck jaws 47 even in the release position for the workpieces 51, shown in FIG. 2, so that the chuck jaws 47 reliably reach this release position.

In the chuck 20 having six chuck jaws 47, one fixing bolt 54 is disposed at each of three places uniformly positioned around the circumference (FIG. 1). Bolts 54 are radially aligned with, and project by a certain extent into, the internal space of the chuck body 21 which is surrounded by the guide surface 45. The fixing bolts 54 are located at the front end of a grub screw 55 which is screwed into a corresponding threaded hole at the chuck body 21. Each of the three of the chuck jaws 47 is provided on its outside with an axial groove 56 corresponding with the arrangement of the fixing bolts 54. The width of the axial grooves 56 matches the diameter of the fixing bolts 54. The groove bottom 57 is at a smaller distance from the longitudinal axis 46 of the chuck 20 than the distance of the end face of the fixing bolts 54 from the longitudinal axis 46. The groove bottom 57 extends parallel to the longitudinal axis 46. The axial grooves 56 taper in the direction of the rear end of the chuck 20. As a result, chuck jaws 47 in use can be freely pulled off toward the front or can be freely inserted from the front into the chuck body 23. The axial grooves 56 are sealingly closed in the direction of the end face 26 to prevent dirt particles from entering the grooves.

The chuck jaws 47 of the work head 22 are actuated by the coupling part 41 of the actuating device 34; that is, the jaws are drawn, together with a workpiece 51, into the gripping position (FIG. 1) or pushed into the release position (FIG. 2). The movement to the release position is facilitated by the rubber-elastic spring elements 53 between the chuck jaws 47.

For transmitting the drawing-in movement from the coupling part 41 to the chuck jaws 47, a circular ring-shaped first contact surface 61, which faces away from the end face 26, is provided on a shoulder on the outer rim of the coupling part 41. As a counter-surface to this, a second contact surface 62 is provided on the chuck jaws 47 and faces the end face 26. Because of the shape of the chuck jaws 47, second contact surface 62 has the form of a segment of a circular ring surface. The inner radius of the contact surface 61 on the chucking part 41 is slightly smaller than the inner radius of the gripping surface 62 on the chuck jaws 47. The same relationship exists between the outer radii of the two contact surfaces 61 and 62. As a result, a certain radial clearance remains for the contact surfaces 62 of the chuck jaws 47 even if these are drawn into the chuck body 21 past the gripping mid-position and thereby execute a radial inward movement which goes beyond their radial mid-position. The outer radius of the contact surface 61 on the coupling part 41 is larger by a predetermined amount than the inner radius of the contact surface 62 on the chuck jaws 47, specifically, by an amount such that a sufficient overlap of the two contact surfaces still exists in the release position of the chuck jaws 47 (FIG. 2). In this release position, the chuck jaws 47 are offset towards the end face 26 by about 2 mm compared with their gripping mid-position. With the selected cone angle of the guide surfaces 45 and 48 of 30°, this release position corresponds to a radial movement of the chuck jaws of about 0.5 mm. In addition, the radii of the two contact surfaces 61 and 62 also correspond to each other in such a manner that the two contact surfaces 61 and 62 no longer overlap one another after a further axial displacement distance of about 8 mm starting from the release position shown in FIG. 2, i.e., after the chuck jaws 47 move free of the coupling part 41 as can be seen from FIG. 7. This corresponds to an additional radial distance of about 2.1 mm. In the gripping mid-position, therefore, the radial overlapping distance of the two gripping surfaces 61 and 62 is about 2.6 mm.

Figure 6:
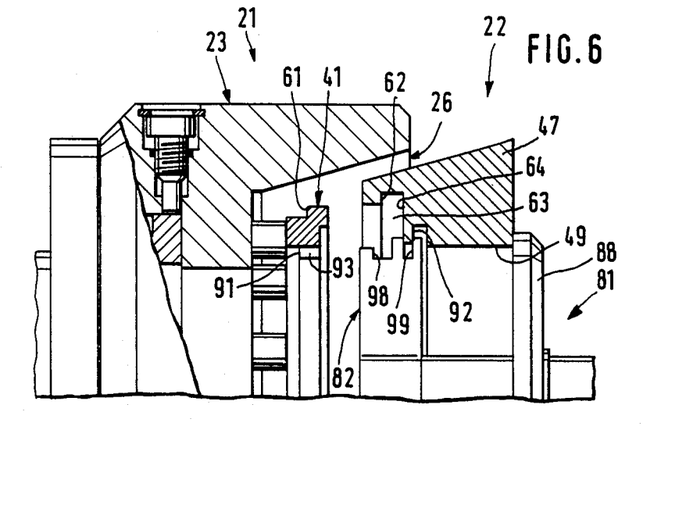
FIGS. 6 to 10 are respective longitudinal sections of the chuck with the key in various positions of actuation during the coupling of a work head.

Since the chuck jaws 47 surround the coupling part 41 on the outside in the coupling position, the contact surface 62 on the chuck jaw 47 is defined by a circumferential groove 63 in the area of the inside rear end of the chuck jaws 47 (FIG. 6). The end face 64 opposite to the second contact surface 62 has an axial distance from the contact surface 62 which is slightly larger than the axial length of the part of the cross-sectional profile adjoining the contact surface 61 on the coupling part 41. Therefore, the chuck jaws 47 can be displaced in the direction of the end face 64, by contacting the gripping part 41 against the end face 64 of the chuck jaws 47, during a displacement movement of the coupling part 41 from the gripping position (FIG. 1) into the release position (FIG. 2).

Figure 7:
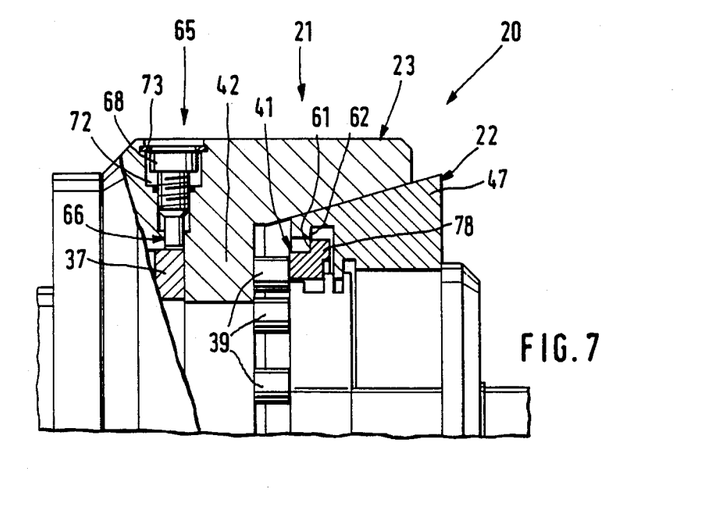

To prevent displacement movement of the coupling part 41 beyond the release position in FIG. 2 and to achieve the decoupling position in FIG. 7 even if no corresponding longitudinal stop exists to stop the draw-in device of the machine tool, a displacement lock 65 is attached at the jaw chuck 20 (see particularly FIGS. 2 and 7). This displacement lock includes two or three locking bolts 66 disposed uniformly over the circumference of the chuck body 21. These locking bolts 66 are provided with a threaded stem 67 and an adjoining key head 68. Key head 68 is suitably provided with a hexagonal recess or with comparable key areas. The locking bolts 66 are respectively seated in radially aligned throughholes 69 in the chuck body 21. Locking bolts 66 project inward by a certain extent into the path of movement of the flange 37 at the draw-in sleeve 35. The locking bolts are disposed in the end area next to the end face of the clearance space for the flange 37 so that they rest precisely against the end face of the disk-shaped part 42 of the chuck body 21. The diameter of the locking bolts 66 is selected to be approximately equal to the additional displacement distance of the actuating device 34 which must travel from the release position (FIG. 2) to the decoupling position (FIG. 7). This dimension ensures that, in the locking position of the locking bolts 66, the flange 37 rests with its end face against the locking bolts 66 in the release position (FIG. 2) and that these bolts are supported against the disk-shaped part 42 of the chuck body 21. This arrangement removes the load of the axial forces from the locking bots 66. The throughhole 69 has a certain section of length having a female thread 71 into which the threaded stem 67 is screwed. An extended circular cylindrical recess 72 accommodates the key head 68. In the outside end area of this recess 72, a circumferential groove is disposed into which a locking ring 73 is inserted. The locking ring has a clear width or a clear projection area which is smaller than the axial projection area of the key head 68. The locking ring 73 therefore forms a lock for preventing the unthreading of locking bolt 66. The depth of the recess 72 (measured in the radial direction) is selected such that the key head 68 can be radially moved in it toward the outside to such an extent that the locking bolt 66 can be completely moved out of its locking position (FIG. 7) in the path of movement of the flange 37 (FIG. 2), thereby enabling the flange 37 to be pushed forward until it rests against the disk-shaped part 42 (FIG. 7). The unthreading lock formed by the locking ring 73 ensures that, even if a locking bolt 66 has inadvertently been left in its release position, it cannot become further detached during operation of the chuck 20 and cannot fly away under the influence of the centrifugal force after the threaded stem 67 has unthreaded from the threaded hole.

As can be seen in FIGS. 1 and 2, a stop element for the workpieces 51 is provided in the internal space of the chuck 20. This stop element comprises a stop sleeve 74 having an end face 75 facing the end face 26, and against which the workpieces 51 rest in the axial direction (FIG. 1) when the chuck jaws 47 are moved into their gripping position. The stop sleeve 74 further comprises a section of length 76 which is provided with an external thread for threading into a matching female thread on the inside circumferential surface of the disk-shaped part 42 of the chuck body 21, and its axial position is determined by a shoulder next to the section 76. A further section of length 77 adjoining the section 76 has an external thread and a smooth inside and outside and extends into a matching expansion of the draw-in sleeve 35 so that both parts act as a type of diaphragm which prevents dirt particles from the internal space of the draw-in sleeve 35 or the internal space of the stop sleeve 74 from falling into the clearance space for the flange 37 and impeding the free movement of the flange.

Due to the fact that the stop element 74 is constructed as a thin-walled stop sleeve, the clear width of which being approximately equal to the clear width of the draw-in sleeve 35, an axial centerhole for rod material is defined which has a very large clear width. During the processing of rod material, work heads are used having gripping surfaces of a radius which is equal to or less than half the clear width of the draw-in sleeve 35 and of the stop sleeve 74. The reduction in the gripping radius can be achieved by correspondingly designed chuck jaws or also by equipping the individual chuck jaws with jaw inserts having inside gripping surfaces of the desired radius. Inasmuch as the workpieces, such as the workpiece 51, are machined as individual pieces, it may be suitable or even necessary to replace the stop sleeve 74 with a stop sleeve which has a smaller centerhole size or with a stop body with a closed end face.

As explained above, it is advantageous to construct the rubber-elastic spring elements 53 between each pair of adjacent chuck jaws 47 (FIG. 3) in such a manner that they exert an expanding force on the chuck jaws 47 not only up to the release position (FIG. 2) but, if possible, up to the decoupling position (FIG. 7) of the work head 22 so that, when the work head is being exchanged, the chuck jaws are radially spread apart to such an extent that the part of the chuck jaws 47 with the second contact surface 62 can be pulled off forward over the profile part 78 of the coupling part 41 (FIG. 7). However, in the reverse sequence of movement, this construction also results in the spring elements 53 generating a resistance force which is equal to the expansion force occurring during the decoupling position (FIG. 7), and this resistance force occurs as soon as the chuck jaws 47 during the axial pushing-in movement are moved radially inward until their contact surfaces 62 engage the coupling part 41 behind the contact surfaces 61. To facilitate this coupling process, it is advantageous to make use of the drawing-in force of the draw-in device of the machine tool. For this purpose, it is necessary to couple the chuck jaws 47 of the work head 22 in a force- or, preferably, a keyway-locking manner to the coupling part 41 before the two contact surfaces 61 and 62 contact one another. An assembly key 81, which is shown in detail in FIG. 4 and FIG. 5 and which can be seen in section in FIGS. 6–10, is used for this coupling purpose.

The key 81 comprises three key bits 82 which are uniformly distributed over the circumference. The three key bits 82 are disposed on a hub part 83 (FIG. 5) which is detachably connected to the stem 84 by means of a head screw 85. Two axially aligned driving pins 86, which are inserted through throughholes in the hub part 83 and inserted into lined holes in the stem 84 aligned with the throughholes, ensure that the hub part 83 is rigidly connected to the stem 84 for rotation therewith. A handle 87 is disposed on the other end of the stem 84. A contact disk 88, which is tightly held at a given axial distance from the key bits 82 by means of two locking rings 89, is also located on the stem 84. The contact disk 88 has, on the side facing the key bits 82, a circular ring-shaped recess into which one locking ring 89 is completely inserted so as to not project over the associated end face of the contact disk 88. The key bits 82 have a circumferential thickness which is smaller than the clear distance between two mutually adjacent chuck jaws 47, as measured at the narrowest position of the chuck jaws 47.

For interaction with the key 81, second contact surfaces 91 are provided on coupling part 41 and second contact surfaces 92 are provided on chuck jaws 47 (FIG. 6). The contact surfaces 91 face away from the end face 26. The contact surfaces 92 face towards the end face 26. The contact surfaces 91 and the contact surfaces 92 are segments of circular ring surfaces. On the coupling body 41, this circular ring surface is defined by a shoulder at the rear end of the coupling part 41. On the chuck jaws 47, this circular ring surface is provided in the area between the first contact surface 62 and the gripping surface 49, that is, in the rear area of the chuck jaws 47, and is defined by a shoulder or by a groove at that location, depending on the radius of the gripping surfaces 49.

Figure 8:
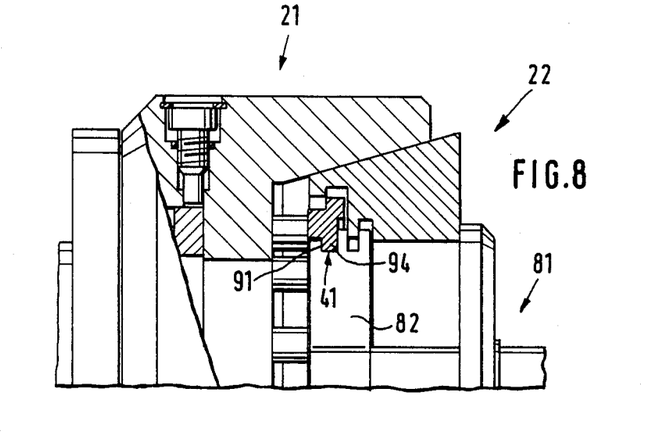
Figures 11, 12:
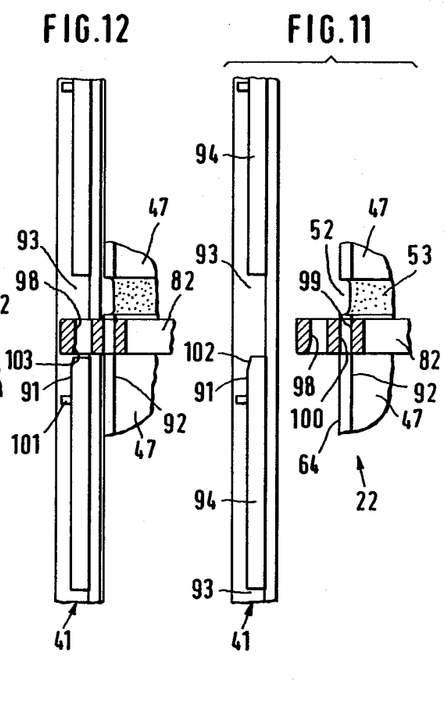
FIG. 11 is a sectional view of the parts to be coupled and the key in a position of actuation during the coupling of a work head.
FIG. 12 is a sectional view of the parts to be coupled and the key in a position of actuation during the coupling of a work head.

On the coupling part 41, the individual contact surfaces 91 are separated from one another by axial grooves 93 on the profile part 94 of the coupling part 41 (FIG. 8). The number of axial grooves 93 and their distribution over the circumference is exactly equal to the number and arrangement of the gaps 52 between the chuck jaws 47. The cross-sectional shape or axial elevation shape of the axial grooves 93 is equal to the section of a circular ring surface having an inner and outer radius approximately equal to the respective radii of the contact surfaces 91 adjoining it. The circumferential extent of the axial grooves 93 is approximately equal to twice the circumferential extent of the key bits 82 (FIG. 3 and FIG. 11). On the work head 22, the separation of the second contact surfaces 92 automatically follows from the division of the work head 22 into individual chuck jaws 47 which are separated from one another by the gaps 52 between them.

Figure 4:
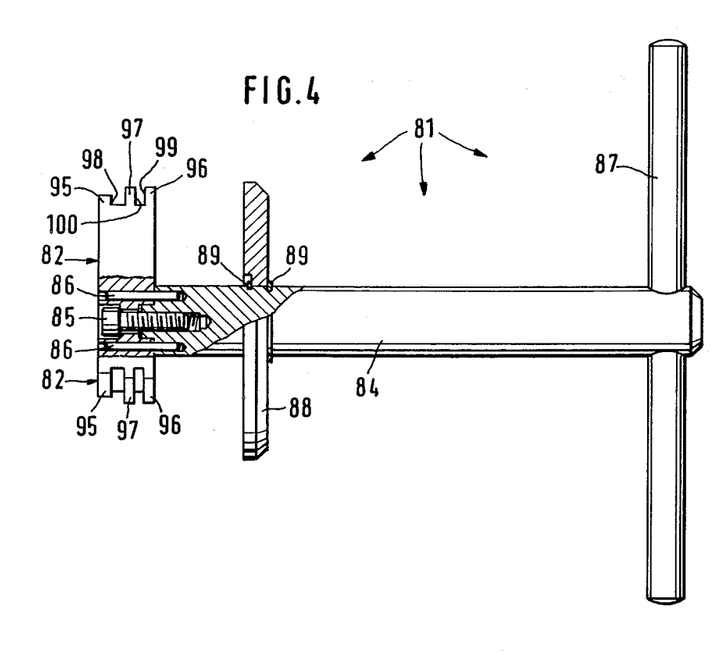
FIG. 4 is a view in partial section of a key for exchanging the work heads of the chuck.
Figure 5:
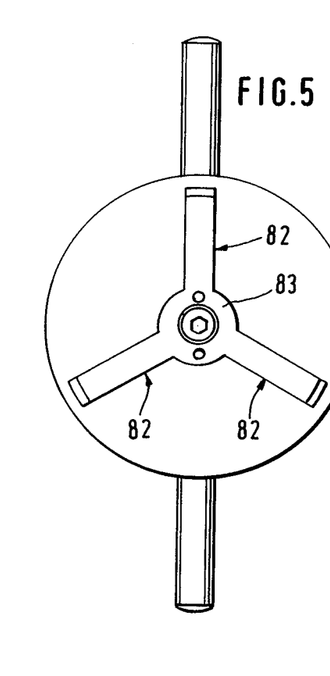
FIG. 5 is a front view of the key according to FIG. 4.

Three steps are provided on the key bits 82 (FIG. 4). The first step 95 is located at the end of the key bits facing away from the handle 87. The second step 96 is located at the opposite end of the key bits 82. The third step 97 is located between first step 95 and second step 96. The end face of the first step 95 facing the handle 87 forms a first contact surface 98 of the key bits 82. The end face of second step 96, facing away from the end face 26, forms a second contact surface 99 and the end face of step 97, facing towards the end face 26, forms a third contact surface 100 of the key bits 82. The surface opposing the third contact surface 100 on the chuck jaws 47 is the end face 64, which is located opposite the first contact surface 62. On the key bits 82, the first contact surface 98 and the second contact surface 99 have a clear distance which is slightly greater than the axial distance of the first contact surface 61 on the coupling part 41 and of the first contact surface 62 on the chuck jaws 47 when these two parts are located in the coupling position (FIG. 7 to FIG. 10).

FIGS. 6 through 18 illustrate how the work head 22 is inserted into the chuck body 21 with the aid of the key 81. In each Figure, a sectional view of the coupling part 41 and of the chuck jaws 47, and a partial sectional view of the key bit 82 are combined with one another and the same illustration in the sequences in FIGS. 11 through 15 in order to provide a better illustration of the interaction of these parts. In this context, the stem of the key 81, which adjoins the key bit 82, is shown in the same manner as the key bit 82 and carries exactly the same designation for the sake of clarity.

Figure 17:
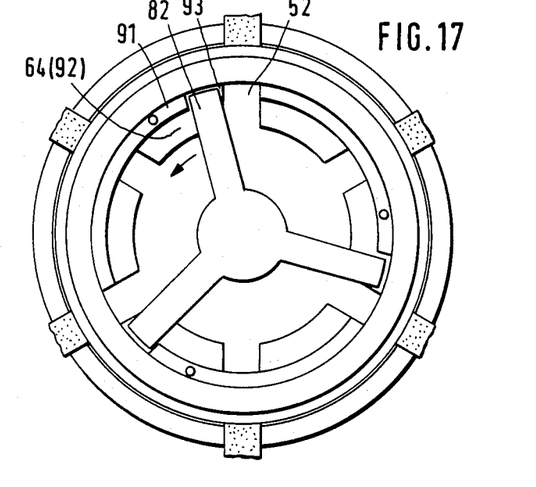
FIG. 17 is a front view, shown in section, of the parts to be coupled and of the key, seen from the rear of the chuck, in a position of actuation during the coupling of a chuck.

Initially, the key 81 is introduced into the free work head 22 by inserting the key bits 82 through the gaps 52 between the chuck jaws (FIG. 16), until the contact disk 88 rests against the end face of the chuck jaws 47 (FIG. 6). The key 81 is turned clockwise by at least one key width; that is, by the circumferential extent of one of the key bits 82. Viewing FIGS. 16, 17 and 18 in sequence, it can be seen that this rotating movement of key 81 appears as movement in the counter-clockwise direction. After this rotating movement, the key bits 82 are no longer aligned with the gaps 52 but are in contact with the second and third contact surfaces 92 and 64, respectively, of the adjacent chuck jaws 47 (FIG. 17 and FIG. 11, right-hand part view). Thus, the work head 22 is coupled to the key 81.

Figure 9:
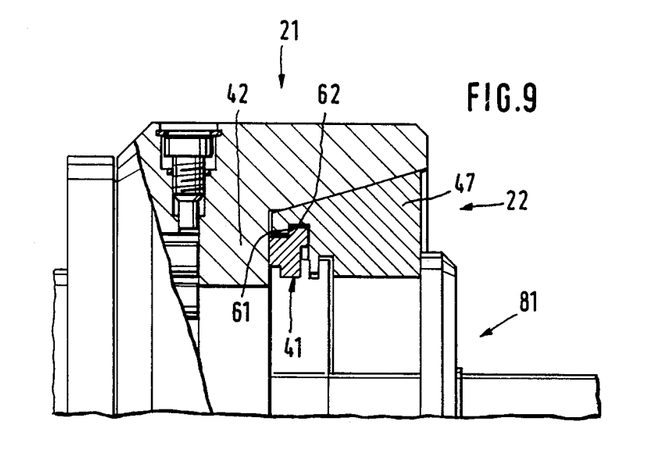
Figures 13, 14:
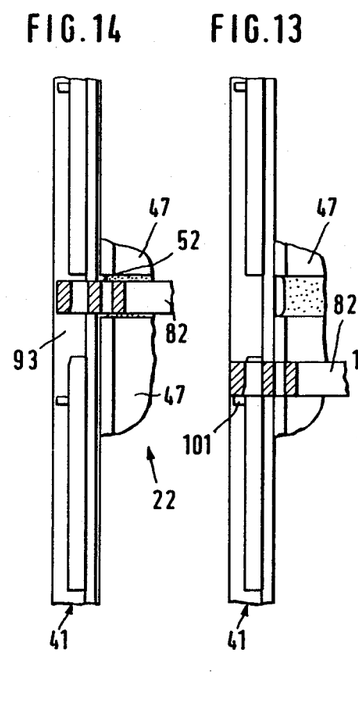
FIG. 13 is a sectional view of the parts to be coupled and the key in a position of actuation during the coupling of a work head.
FIG. 14 is a sectional view of the parts to be coupled and the key in a position of actuation during the coupling of a work head.
Figure 18:
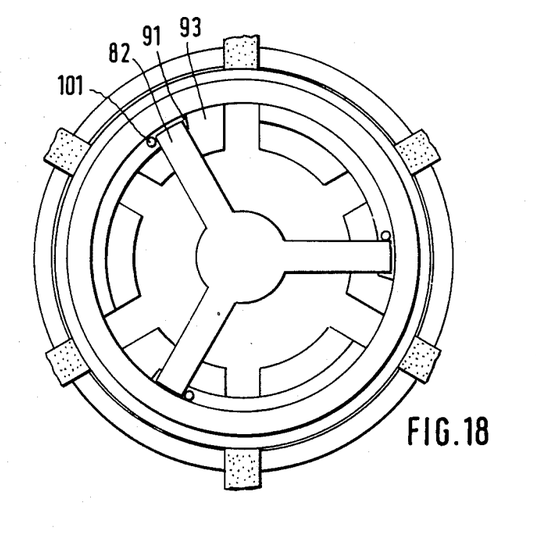
FIG. 18 is a front view, shown in section, of the parts to be coupled and of the key, seen from the rear of the chuck, in a position of actuation during the coupling of a chuck.

The key 81 with the work head 22 is introduced into the chuck body 21 in a rotational position such that the key bits 82 are aligned with the axial grooves 93 on the coupling part 41 (FIG. 17 and FIG. 12). During this process, the key 81 is pushed, or, if necessary, pressed into the chuck body 21 so that the first contact surface 98 at the key bits 82 is approximately aligned in the circumferential direction with the first contact surface 91 on the coupling part 41 (FIG. 7 and FIG. 12). In this axial position of the work head 22, the key 81 is again twisted clockwise by one key width so that the first contact surface 88 of the key bits 82 is axially aligned with the first contact surface 91 on the coupling part 41 (FIG. 18, FIG. 13 and FIG. 8). To easily and reliably position key 81 in this rotational position, a stop pin 101 is disposed adjacent the rotational end position of each respective key bit 82 on the coupling part 41 so that the key bits 82 come to rest against these stop pins (FIG. 18 and FIG. 13). This second rotational movement of the key 81 is facilitated by entering slopes 102 provided on second contact surfaces 91 and adjacent each axial groove 93 on the coupling part 41. Similarly, the contact surfaces 98 of the first step 95 of the key bits 82 are also provided with an entering slope 103. With this second rotational movement of the key 81, the work head 22 and the coupling part 41 are axially coupled to one another via the key 81. This axial position of the work head 22 is therefore also referred to as the coupling position and, during the reverse sequence of the coupling processes, is also referred to as the uncoupling position of the work head 22. After this coupling process, the draw-in device of the machine tool is actuated and, via the actuating device 34 (FIG. 1), the coupling part 41, together with the work head 22, is drawn into the chuck body 21 until the coupling part 41 rests against the disk-shaped part 42 of the chuck body 21 (FIG. 9). During this axial displacement movement of the coupling part 41 and of the work head 22, the chuck jaws 47 simultaneously move radially inward so that the first contact surfaces 62 on the chuck jaws 47 begin to overlap the first contact surfaces 61 on the coupling part 41 after a short amount of displacement movement. This overlap is greatest in the axial end position of the two parts (FIG. 9). In this axial end position of the coupling part 41, the locking bolts 66 of the displacement lock 65 are moved into their locking position (FIG. 10) in which they project into the path of movement of the flange 37 on the draw-in sleeve 35 so that the flange part 37 abuts the locking bolt 66 during any subsequent displacement of the draw-in sleeve 35 (FIG. 2). As a result of this abutting contact, the parts coupled to one another, that is, the coupling part 41 and the work head 22, can no longer inadvertently move into the uncoupling position (FIG. 7).

Figure 10:
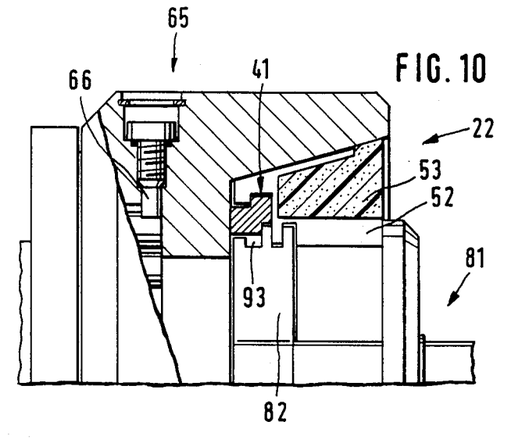
Figure 15:
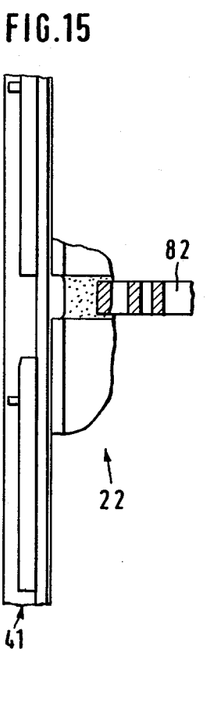
FIG. 15 is a sectional view of the parts to be coupled and the key in a position of actuation during the coupling of a work head.
Figure 16:
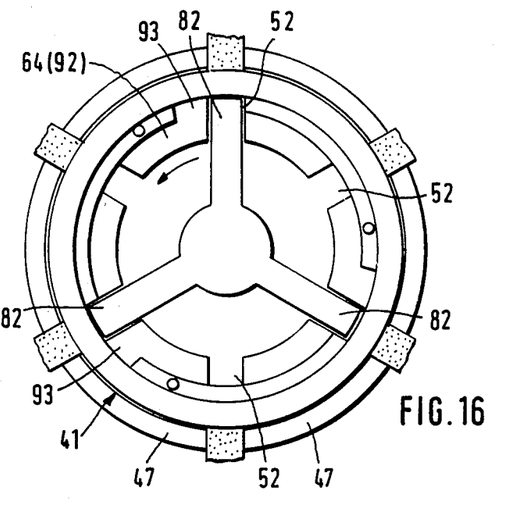
FIG. 16 is a front view, shown in section, of the parts to be coupled and of the key, seen from the rear of the chuck, in a position of actuation during the coupling of a chuck.

To uncouple key 81 from work head 22, the key 81 is turned back by two key widths into a rotational position in which the key bits 82 are axially aligned, both with the gaps 52 between the chuck jaws 47 and with the axial grooves 93 in the coupling part 41 (FIG. 14 and FIG. 10). In this rotational position, the key 81 is pulled out of the chuck 20 (FIG. 15). This completes the coupling process for the work head 22.

To remove a work head 22 located in the chuck 20, the key 81 is again pushed into the gaps 52 until its contact disk 88 rests against the work head 22. The key is then turned clockwise by one key width until its key bits are aligned with contact surfaces 92 and 64 on the chuck jaws 47 (FIG. 12). In this rotational position of the key 81, the displacement locks 65 are moved out of the locking position into the release position. The coupling part 41 together with the work head 22 can thereafter be pushed forward by means of the draw-in device of the machine tool until both parts have reached their uncoupling position (FIG. 7). The work head 22 can then be completely pulled out of the chuck body 21 by means of the key 81. After the key 81 has been turned back counterclockwise into its initial position (FIG. 16), it can then be pulled out of the work head 22 or, conversely, the work head 22 can be lifted or pulled off the key 81.

To exchange a work head 22, the stop sleeve 74 is first turned out of the chuck body 21 and subsequently turned in again. If required, the stop sleeve 74 is also exchanged for another stop sleeve.

What is claimed is:

1. A chuck assembly having an axis for releasably securing a workpiece to a machine having a means for drawing the chuck assembly toward the machine, the chuck comprising:

a chuck body having a front and a rear end, the chuck body having a guide surface substantially in the shape of a truncated cone which is coaxial with the axis and which widens in the direction of the rear end of the chuck body;

a coupling part slidably carried in the chuck body and displaceable relative to the chuck body along the axis, the coupling part having a generally ring-shaped contact surface adapted to face the front end of the chuck body, the coupling part being adapted to be displaced relative to the chuck body by the means for drawing the chuck toward the machine; and chuck jaw means movably receivable in the chuck body and having a plurality of chuck jaws, each chuck jaw comprising an inner gripping surface radially displaceable relative to the axis for gripping and releasing the workpiece and an outer guide surface, the chuck jaws being secured adjacent one another with spring elements positioned therebetween so that the outer guide surfaces of the chuck jaws form a surface substantially in the shape of a truncated cone which corresponds to the shape of the guide surface of the chuck body, whereby the plurality of chuck jaws can be snugly received within the chuck body, each chuck jaw further comprising a shoulder defining a contact surface adapted to abut the contact surface of the coupling part, whereby the coupling part is axially displaceable to pull the chuck jaws into the chuck body so that the outer guide surfaces of the chuck jaws slidingly contact the guide surface of the chuck body and radially displace the inner gripping surfaces of the chuck jaws to grip the workpiece.

2. A chuck assembly as claimed in claim 1 wherein the coupling part further comprises a displacement lock for limiting the displacement of the coupling part.

3. A chuck assembly as claimed in claim 2 wherein the displacement lock comprises a locking bolt, the locking bolt having a threaded shaft and a key head.

4. A chuck assembly as claimed in claim 3 wherein the displacement lock further comprises means for preventing unthreading of the locking bolt.

5. A chuck assembly as claimed in claim 4 wherein the means for preventing unthreading of the locking bolt comprises a locking ring.

6. A chuck assembly as claimed in claim 1 wherein the chuck body further comprises a fixing bolt and each chuck jaw further comprises a longitudinal groove in its outer guide surface, whereby the fixing bolt is aligned in one of the longitudinal grooves when the plurality of chuck jaws are received in the chuck body.

7. A chuck assembly as claimed in claim 1 wherein the chuck body further comprises a stop element detachably connected to it for limiting the axial insertion of the workpiece.

8. A chuck assembly as claimed in claim 1 wherein each chuck jaw further comprises a flat stop surface.

9. A chuck assembly as claimed in claim 1, further comprising a key for installing and removing the chuck jaw means to and from the chuck assembly, the key comprising a stem having a plurality of key bits at one end, the key bits being adapted to engage the chuck jaw means in order to contact the chuck jaw means with the coupling part and to release the chuck jaw means from contact with the coupling part.

10. A chuck assembly as claimed in claim 9 wherein the key further comprises a contact disk spaced from the plurality of key bits and adapted to abut one axial end of the chuck jaw means.

11. A chuck assembly as claimed in claim 9, further comprising a plurality of chuck jaw means which may be installed and removed by said key.

* * * * *